(12) United States Patent
Roth

(10) Patent No.: US 9,316,347 B2
(45) Date of Patent: Apr. 19, 2016

(54) REARVIEW ASSEMBLY WITH INTERCHANGEABLE REARWARD VIEWING DEVICE

(71) Applicant: Gentex Corporation, Zeeland, MI (US)

(72) Inventor: Mark R. Roth, Coloma, MI (US)

(73) Assignee: GENTEX CORPORATION, Zeeland, MI (US)

( * ) Notice: Subject to any disclaimer, the term of this patent is extended or adjusted under 35 U.S.C. 154(b) by 239 days.

(21) Appl. No.: 13/749,541

(22) Filed: Jan. 24, 2013

(65) Prior Publication Data

US 2013/0187017 A1 Jul. 25, 2013

Related U.S. Application Data

(60) Provisional application No. 61/590,259, filed on Jan. 24, 2012.

(51) Int. Cl.
*F16M 13/02* (2006.01)
*B60R 1/04* (2006.01)

(52) U.S. Cl.
CPC ............... *F16M 13/02* (2013.01); *B60R 1/04* (2013.01); *Y10T 29/49826* (2015.01)

(58) Field of Classification Search
USPC ................ 248/205.1, 205.2; 359/871, 872
See application file for complete search history.

(56) References Cited

U.S. PATENT DOCUMENTS

| | | | |
|---|---|---|---|
| 3,280,701 A | 10/1966 | Donnelly et al. | |
| 3,837,129 A | 9/1974 | Losell | |
| 4,733,336 A * | 3/1988 | Skogler et al. | 362/142 |
| 4,807,096 A * | 2/1989 | Skogler et al. | 362/142 |
| 4,902,108 A | 2/1990 | Byker | |
| 5,052,163 A | 10/1991 | Czekala | |
| 5,066,112 A | 11/1991 | Lynam et al. | |
| 5,069,535 A | 12/1991 | Baucke et al. | |
| 5,073,012 A | 12/1991 | Lynam | |
| 5,076,673 A | 12/1991 | Lynam et al. | |
| 5,115,346 A | 5/1992 | Lynam | |
| 5,128,799 A | 7/1992 | Byker | |
| 5,151,824 A | 9/1992 | O'Farrell | |
| 5,158,638 A | 10/1992 | Osanami et al. | |
| 5,253,109 A | 10/1993 | O'Farrell et al. | |
| 5,278,693 A | 1/1994 | Theiste | |

(Continued)

FOREIGN PATENT DOCUMENTS

| WO | WO0101192 | 1/2001 |
|---|---|---|
| WO | WO2011044312 | 4/2011 |
| WO | WO2012051500 | 4/2012 |

OTHER PUBLICATIONS

Creative Materials, Inc., Description of Pressure Sensitive Tape, series 300-01; available at http://creativematerials.com; 1 page.

(Continued)

*Primary Examiner* — Steven Marsh
(74) *Attorney, Agent, or Firm* — Price Heneveld LLP; Scott P. Ryan

(57) ABSTRACT

A rearview assembly kit for a vehicle having a housing. A connecting interface is disposed on a forward edge of the housing that is configured to removably connect the housing to any one of a rearview device having a peripheral edge with a bezel, or a rearview device having a peripheral edge that is at least partially ground away. A rearview device includes an outer ring proximate a peripheral edge thereof.

13 Claims, 2 Drawing Sheets

(56) References Cited

U.S. PATENT DOCUMENTS

| | | | |
|---|---|---|---|
| 5,280,380 A | 1/1994 | Byker | |
| 5,282,077 A | 1/1994 | Byker | |
| 5,294,376 A | 3/1994 | Byker | |
| 5,336,448 A | 8/1994 | Byker | |
| 5,379,146 A | 1/1995 | Defendini | |
| 5,421,940 A | 6/1995 | Cornils et al. | |
| 5,448,397 A | 9/1995 | Tonar | |
| 5,649,756 A | 7/1997 | Adams et al. | |
| 5,679,283 A | 10/1997 | Tonar | |
| 5,682,267 A | 10/1997 | Tonar | |
| 5,689,370 A | 11/1997 | Tonar | |
| 5,742,026 A | 4/1998 | Dickinson | |
| 5,790,298 A | 8/1998 | Tonar | |
| 5,803,579 A | 9/1998 | Turnbull | |
| 5,808,778 A | 9/1998 | Bauer et al. | |
| 5,818,625 A | 10/1998 | Forgette et al. | |
| 5,825,527 A | 10/1998 | Forgette et al. | |
| 5,837,994 A | 11/1998 | Stam | |
| 5,888,431 A | 3/1999 | Tonar et al. | |
| D410,607 S | 6/1999 | Carter | |
| 5,923,027 A | 7/1999 | Stam | |
| 5,923,457 A | 7/1999 | Byker et al. | |
| 5,928,572 A | 7/1999 | Tonar et al. | |
| 5,940,201 A | 8/1999 | Ash et al. | |
| 5,956,012 A | 9/1999 | Turnbull et al. | |
| 5,984,482 A | 11/1999 | Rumsey et al. | |
| 5,990,469 A | 11/1999 | Bechtel | |
| 5,998,617 A | 12/1999 | Srinivasa | |
| 6,002,511 A | 12/1999 | Varaprasad | |
| 6,008,486 A | 12/1999 | Stam | |
| 6,020,987 A | 2/2000 | Baumann | |
| 6,023,040 A | 2/2000 | Zahavi | |
| 6,023,229 A | 2/2000 | Bugno et al. | |
| 6,037,471 A | 3/2000 | Srinivasa | |
| 6,043,452 A | 3/2000 | Bestenlehrer | |
| 6,049,171 A | 4/2000 | Stam | |
| 6,051,956 A | 4/2000 | Nakashimo | |
| 6,062,920 A | 5/2000 | Jordan | |
| 6,064,508 A | 5/2000 | Forgette et al. | |
| 6,064,509 A | 5/2000 | Tonar et al. | |
| 6,068,380 A | 5/2000 | Lynn et al. | |
| 6,084,700 A | 7/2000 | Knapp | |
| 6,102,546 A | 8/2000 | Carter | |
| 6,111,683 A | 8/2000 | Cammenga | |
| 6,111,684 A | 8/2000 | Forgette | |
| 6,130,421 A | 10/2000 | Bechtel | |
| 6,130,448 A | 10/2000 | Bauer et al. | |
| 6,132,072 A | 10/2000 | Turnbull | |
| 6,140,933 A | 10/2000 | Bugno | |
| 6,166,848 A | 12/2000 | Cammenga et al. | |
| 6,170,956 B1 | 1/2001 | Rumsey et al. | |
| 6,188,505 B1 | 2/2001 | Lomprey | |
| 6,193,378 B1 | 2/2001 | Tonar et al. | |
| 6,193,912 B1 | 2/2001 | Theiste | |
| 6,195,194 B1 | 2/2001 | Roberts et al. | |
| 6,222,177 B1 | 4/2001 | Bechtel | |
| 6,224,716 B1 | 5/2001 | Yoder | |
| 6,229,435 B1 | 5/2001 | Knapp | |
| 6,239,898 B1 | 5/2001 | Byker | |
| 6,239,899 B1 | 5/2001 | DeVries et al. | |
| 6,244,716 B1 | 6/2001 | Steenwyk | |
| 6,246,507 B1 | 6/2001 | Bauer | |
| 6,247,819 B1 | 6/2001 | Turnbull | |
| 6,249,369 B1 | 6/2001 | Theiste et al. | |
| 6,255,639 B1 | 7/2001 | Stam | |
| 6,262,831 B1 | 7/2001 | Bauer | |
| 6,262,832 B1 | 7/2001 | Lomprey | |
| 6,268,950 B1 | 7/2001 | Ash | |
| 6,281,632 B1 | 8/2001 | Stam | |
| 6,291,812 B1 | 9/2001 | Bechtel | |
| 6,313,457 B1 | 11/2001 | Bauer | |
| 6,317,248 B1 | 11/2001 | Agrawal et al. | |
| 6,335,548 B1 | 1/2002 | Roberts | |
| 6,356,376 B1 | 3/2002 | Tonar | |
| 6,359,274 B1 | 3/2002 | Nixon | |
| 6,379,013 B1 | 4/2002 | Bechtel | |
| 6,392,783 B1 | 5/2002 | Lomprey | |
| 6,402,328 B1 | 6/2002 | Bechtel | |
| 6,403,942 B1 | 6/2002 | Stam | |
| 6,407,468 B1 | 6/2002 | LeVesque et al. | |
| 6,407,847 B1 | 6/2002 | Poll et al. | |
| 6,420,800 B1 | 7/2002 | LeVesque | |
| 6,426,485 B1 | 7/2002 | Bulgajewski | |
| 6,429,594 B1 | 8/2002 | Stam | |
| 6,441,943 B1 | 8/2002 | Roberts | |
| 6,465,963 B1 | 10/2002 | Turnbull | |
| 6,469,739 B1 | 10/2002 | Bechtel | |
| 6,471,362 B1 | 10/2002 | Carter | |
| 6,504,142 B2 | 1/2003 | Nixon | |
| 6,512,624 B2 | 1/2003 | Tonar | |
| 6,521,916 B2 | 2/2003 | Roberts | |
| 6,523,976 B1 | 2/2003 | Turnbull | |
| 6,545,794 B2 | 4/2003 | Ash | |
| 6,587,573 B1 | 7/2003 | Stam | |
| 6,606,183 B2 | 8/2003 | Ikai et al. | |
| 6,614,579 B2 | 9/2003 | Roberts et al. | |
| 6,635,194 B2 | 10/2003 | Kloeppner | |
| 6,650,457 B2 | 11/2003 | Busscher et al. | |
| 6,657,767 B2 | 12/2003 | Bonardi | |
| 6,700,692 B2 | 3/2004 | Tonar | |
| 6,774,988 B2 | 8/2004 | Stam | |
| 6,781,738 B2 | 8/2004 | Kikuchi et al. | |
| 6,816,297 B1 | 11/2004 | Tonar | |
| 6,861,809 B2 | 3/2005 | Stam | |
| 6,870,656 B2 | 3/2005 | Tonar et al. | |
| 6,968,273 B2 | 11/2005 | Ockerse | |
| 7,042,616 B2 | 5/2006 | Tonar et al. | |
| 7,064,882 B2 | 6/2006 | Tonar | |
| 7,287,868 B2 | 10/2007 | Carter | |
| 7,324,261 B2 | 1/2008 | Tonar et al. | |
| 7,342,707 B2 | 3/2008 | Roberts | |
| 7,417,717 B2 | 8/2008 | Pack | |
| 7,592,563 B2 | 9/2009 | Wissenbach | |
| 7,663,798 B2 | 2/2010 | Tonar | |
| 7,688,495 B2 | 3/2010 | Tonar et al. | |
| 7,706,046 B2 | 4/2010 | Bauer et al. | |
| 7,746,534 B2 | 6/2010 | Tonar et al. | |
| 7,817,020 B2 | 10/2010 | Turnbull et al. | |
| 7,830,583 B2 | 11/2010 | Neuman et al. | |
| 7,864,399 B2 | 1/2011 | McCabe et al. | |
| 7,978,393 B2 | 7/2011 | Tonar et al. | |
| 8,035,881 B2 | 10/2011 | Luten | |
| 2002/0021481 A1 | 2/2002 | Lin et al. | |
| 2004/0066568 A1* | 4/2004 | Bauer | 359/838 |
| 2004/0196179 A1* | 10/2004 | Turnbull | 342/357.06 |
| 2008/0297879 A1 | 12/2008 | Tonar et al. | |
| 2008/0302657 A1 | 12/2008 | Luten et al. | |
| 2009/0296190 A1 | 12/2009 | Anderson et al. | |
| 2010/0085653 A1* | 4/2010 | Uken et al. | 359/872 |
| 2010/0110553 A1 | 5/2010 | Anderson et al. | |
| 2010/0277786 A1 | 11/2010 | Anderson et al. | |
| 2011/0168687 A1 | 7/2011 | Door | |
| 2011/0176323 A1 | 7/2011 | Skiver et al. | |
| 2011/0181727 A1 | 7/2011 | Weller et al. | |
| 2012/0038964 A1 | 2/2012 | De Wind et al. | |
| 2012/0069444 A1 | 3/2012 | Campbell et al. | |
| 2012/0229882 A1 | 9/2012 | Fish, Jr. et al. | |
| 2012/0236388 A1* | 9/2012 | De Wind et al. | 359/267 |

OTHER PUBLICATIONS

3M, Inc., Brochure; Reliable Tapes for the Solar Industry; 8 pages; available at the website of 3M, Inc.

3M, Inc., Brochure; Adhesive Transfer Tape with 300LSE Adhesive; 4 pages; available at the website of 3M, Inc.

3M, Inc., Brochure; Double Coated Polyethylene Foam Tapes; 4 pages; available at the website of 3M, Inc.

* cited by examiner

REARVIEW ASSEMBLY WITH INTERCHANGEABLE REARWARD VIEWING DEVICE

CROSS-REFERENCE TO RELATED APPLICATION

This application claims priority to and the benefit under 35 U.S.C. §119(e) of U.S. Provisional Patent Application No. 61/590,259, filed on Jan. 24, 2012, entitled "REARVIEW ASSEMBLY WITH INTERCHANGEABLE REARWARD VIEWING DEVICE:" the entire disclosure of which is hereby incorporated herein by reference.

BACKGROUND OF THE INVENTION

The present invention generally relates to vehicle rearview assemblies, and more particularly, to a rearview assembly configured to be fitted with a variety of different rearward viewing devices.

SUMMARY OF THE INVENTION

One aspect of the present invention includes a rearview assembly kit for a vehicle having a housing. A connecting interface is disposed on a forward edge of the housing that is configured to removably connect the housing to one of a rearview device having a peripheral edge with a bezel, a rearview device having a peripheral edge that is at least partially ground away, and a rearview device includes an outer ring proximate a peripheral edge thereof.

Another aspect of the present invention includes a vehicle interior rearview mirror assembly having a housing. A detachable interface assembly includes a connecting interface disposed on a forward edge of the housing that is configured to removably connect the housing to one of a rearview device having a peripheral edge with a bezel, a rearview device having a peripheral edge that is at least partially ground away, and a rearview device having an outer ring proximate a peripheral edge thereof.

Yet another aspect of the present invention includes a method of constructing a rearview assembly for a vehicle. A housing is formed. A connecting interface is formed on the housing. The housing is removably connected with one of a rearview device having a peripheral edge with a bezel, a rearview device having a peripheral edge that is at least partially ground away, and a rearview device includes an outer ring proximate a peripheral edge thereof.

Yet another aspect of the present invention includes a rearview assembly that includes a housing adapted for connection with any of a variety of rearward viewing devices. The housing includes a connecting interface that is configured to couple any of the variety of rearward viewing devices to the housing. The housing includes hardware and software to support any of the variety of rearward viewing devices, such that the final rearview assembly may be assembled by a vehicle manufacturer.

These and other aspects, objects, and features of the present invention will be understood and appreciated by those skilled in the art upon studying the following specification, claims, and appended drawings.

DETAILED DESCRIPTION OF EMBODIMENTS

Figure 1:
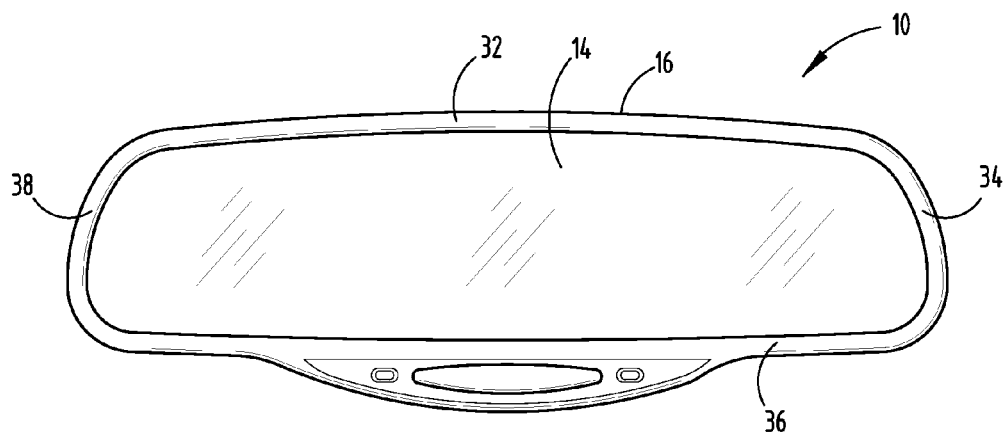
FIG. 1 is a front elevational view of an interior rearview assembly for a motor vehicle in accordance with one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
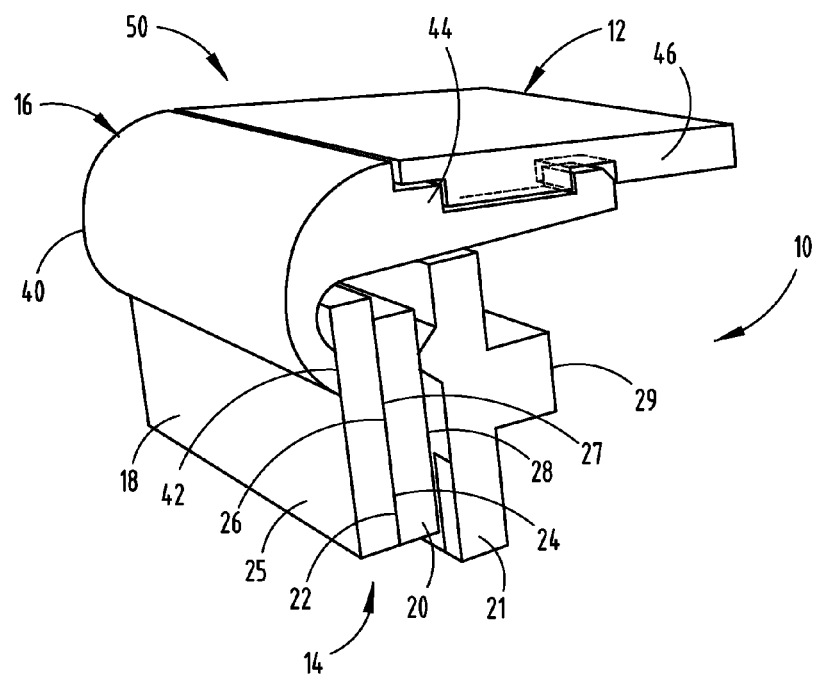
FIG. 2 is an enlarged cross-sectional partial view of one embodiment of a rearview assembly of the present invention.

Referring to FIGS. 1 and 2, reference numeral 10 generally designates a rearview assembly that includes a mount configured to be coupled with a button on an inside surface of a windshield of a vehicle. Alternatively, the rearview assembly 10 may be coupled with a header of the vehicle. The rearview assembly 10 includes a housing 12 and a rearward viewing device 14. The housing 12 may be coupled to the mount by way of a ball and socket arrangement, for example. Alternatively, the rearward viewing device 14 may be coupled to the mount, in which case the housing 12 is coupled to the rearward viewing device 14. The rearward viewing device 14 is designed to provide a rearward view to a vehicle driver. The housing 12 is designed to protect the rearward viewing device 14 and circuitry or mechanical devices disposed behind the rearward viewing device 14.

The rearview assembly 10 is configured to enable a variety of different types of rearward viewing devices to be affixed to a single housing type. These rearward viewing devices are considered "interchangeable" and are adapted to be disposed in the housing 12, each in a similar manner. The housing 12 is constructed to accommodate the different circuitry, hardware, etc. necessary to operate a variety of rearward viewing devices. Stated differently, a single housing 12 can be utilized with different versions or types of rearward viewing devices. Non-limiting examples of the types of rearward viewing devices include self-dimming electrochromic mirrors, prism-type mirrors, and display-type mirrors that include LED or OLED technology to display an image. While the components that form the different types of rearward viewing devices may be different, each of the rearward viewing devices are generally configured to be affixed to the housing 12 in the same manner.

Referring to the embodiment generally illustrated in FIG. 2, the rearward viewing device 14 includes front and rear glass elements 18 and 20. The front and rear glass elements 18, 20 define a first surface 25, a second surface 26, a third surface 27, and a fourth surface 28. A reflective layer 24, as illustrated, is disposed on the third surface 27. However, it will be generally understood that the reflective layer 24 may be disposed on the fourth surface 28. The rearward viewing device 14 also includes an electrochromic (EC) material 22 disposed between the second and third surfaces 26, 27. The rearview assembly 10 includes a bezel 16 disposed around a peripheral edge of the rearward viewing device 14. A carrier plate 21 is positioned behind the rearward viewing device 14 and supports the rearward viewing device 14 and a printed circuit board (PCB) that is configured to control the operability of the rearward viewing device 14. The carrier plate 21 includes a PCB abutment member 29 that serves as a locator for the PCB. The PCB abutment member 29 positively positions the PCB behind the carrier plate 21.

Figure 3:
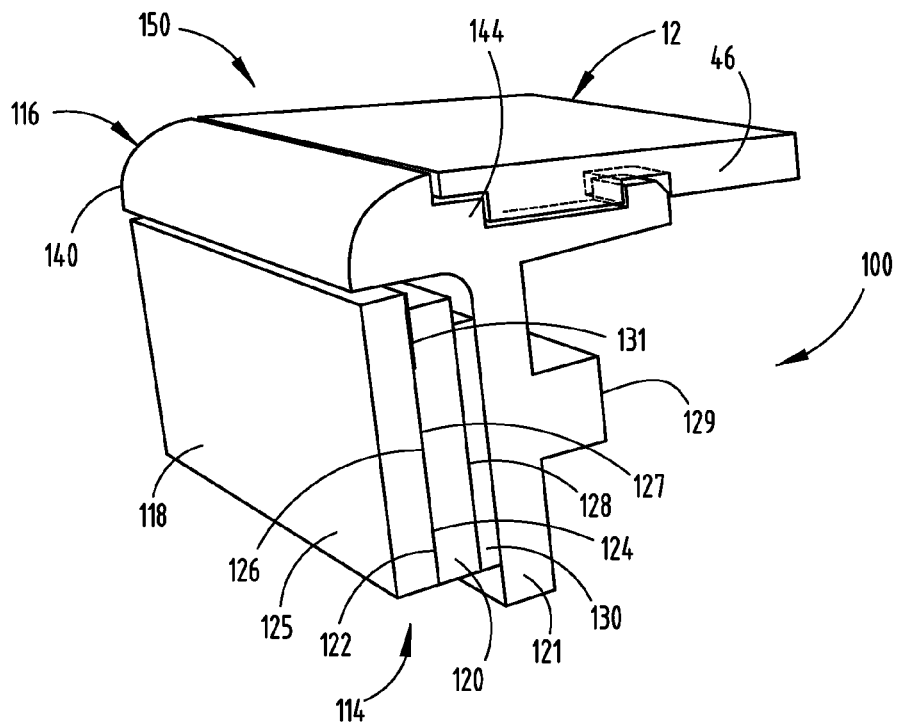
FIG. 3 is an enlarged cross-sectional partial view of another embodiment of a rearview assembly of the present invention.
Figure 4:
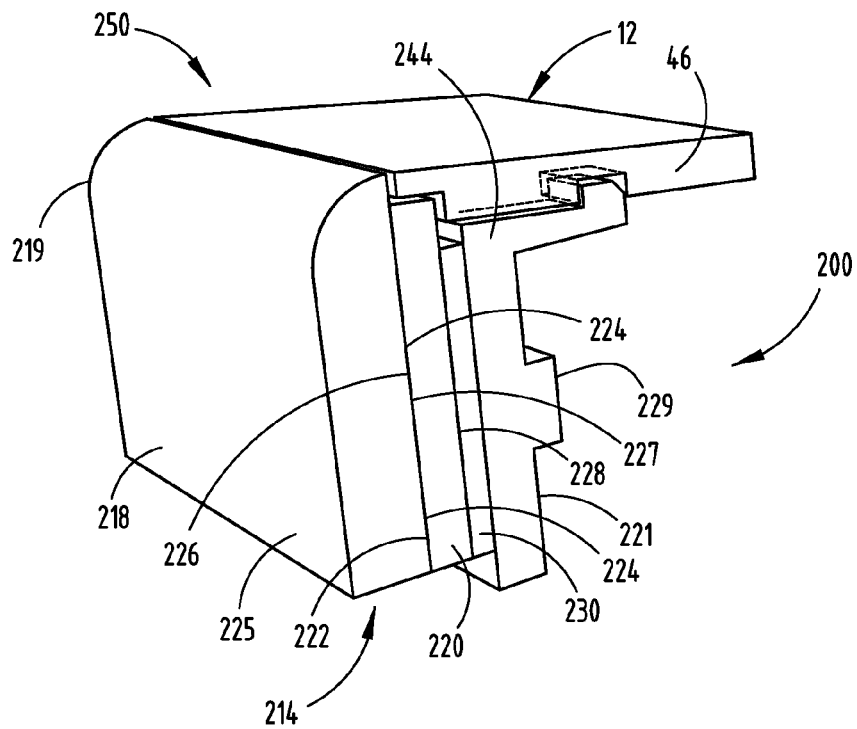
FIG. 4 is an enlarged cross-sectional partial view of another embodiment of a rearview assembly of the present invention.

The bezel 16 includes a top portion 32, a bottom portion 36, a first side wall portion 34, and a second side wall portion 38 (FIG. 1) that cover a peripheral edge of the rearward viewing device 14 and cover a forward edge of the housing 12. Each of the wall portions 32, 34, 36, 38 include an aesthetic rounded flange 40 that extends around a perimeter of the rearward viewing device 14, and a resilient sealing portion 42 that engages the first surface 25 of the front glass element 18. Each of the wall sections 32, 34, 36, 38 further includes a rearwardly extending bottom flange 44 that overlappingly engages a front edge 46 of the housing 12. The overlapping portions define a connecting interface 50 that includes mating resilient hooks and aperture connectors (as shown in FIGS. 2-4) for providing snap attachment of the bezel 16 to the housing 12, as would be understood by one having ordinary skill in the art. Alternatively, the bottom flange 44 and front edge 46 may include a friction fit or possibly a magnetic connection at the mating stepped surfaces of the overlapping portion. It is also contemplated that other configurations may be constructed at the connecting interface 50 of the bottom flange 44 and the front edge 46. For example, the stepped construction could extend into the peripheral edge of the bezel 16. Alternatively, a slanted or rounded edge may be posed at the connecting interface 50 of the bottom flange 44 and the front edge 46. It should be noted that other connecting mechanisms can also be used, such as a designed interference fit, welding, gluing, mechanical fastening, magnetic fastening, or any other suitable means of releasably or permanently connecting components. To assemble the relevant components of the rearview assembly 10, the rearward viewing device 14 is inserted into the bezel 16 so that the sealing flange 42 engages the first surface 25 of the front glass element 18. The sub-assembly is then installed into the housing 12.

The PCB is located in the housing 12, and includes a circuit thereon for causing an electrical potential across the EC material 22 to darken reflected images, such as when bright glaring headlights are sensed at night. The PCB potentially further includes multiple circuits, such as for supporting functions, such as compass/direction sensing, global position sensing, temperature sensing, daylight sensing, sensing of glaring light, such as bright headlamps, keyless entry, passenger airbag on/off control, garage door control function and transmitting, telecommunication functions, and the like. These additional functions may be supported by circuits that are partially or completely on the PCB or in the housing 12.

Referring now to FIG. 3, another embodiment of a rearview assembly 100 is generally illustrated that includes a rearward viewing device 114 having an electrochromic mirror construction. The rearview assembly 100 includes a peripheral edge having a bezel 116 with a quarter-round construction 140 that is disposed around the periphery of the rearward viewing device 114. For aesthetic reasons, it is often desirable to either not have a peripheral bezel or have a bezel with a lip that surrounds the perimeter edge of the rearview assembly 10 and is substantially flush with a front glass element 118. Accordingly, bezel 116 is similar to bezel 16, with the exception that bezel 116 does not cover a front surface of the front glass element 118 but is only disposed around a periphery of the rearward viewing device 114.

The rearward viewing device 114 includes front and rear glass elements 118, 120. The front glass element 118 defines first and second surfaces 125, 126. The rear glass element 120 defines third and fourth surfaces 127, 128. A reflective layer 124 is disposed on the third surface 127 of the rear glass element 120, but could also be disposed on the fourth surface 128. An EC material 122 is disposed between the second surface 126 and the third surface 127. A foam backer or adhesive 130 is positioned between the rearward viewing device 114 and a carrier plate 121 that is integrally connected with the bezel 116. The carrier plate 121 includes a PCB abutment member 129 that serves as a locator for the PCB. The PCB abutment member 129 positively positions the PCB behind the carrier plate 121.

The rearward viewing device 114 also includes an outer ring 131. The outer ring 131, often generally referred to as a chrome ring by those having ordinary skill in the art, is formed from a material that closely resembles the underlying reflective layer 124. The outer ring 131 is provided about a periphery of the rear glass element 120 to hide contacts coupled within the EC material 122, thereby hiding the contacts from view. By closely matching the outer ring 131 and the main reflector, the appearance is that the outer ring 131 and the third surface 127 of the rear glass element 120 are integral, thus providing an aesthetically appealing design.

The bezel 116 and housing 12 have substantially the same overlapping portions that provide attachment of the bezel 16 to the housing 12. To assemble the relevant components of the rearview assembly 100, the rearward viewing device 114 can be coupled with the carrier plate 121 of the bezel 116, and this sub-assembly can then be installed into the housing 12 by contacting a bottom flange 144 with the front edge 46 of the housing 12. A connecting interface 150 couples the housing 12 and the rearward viewing device 114. Because the configuration of the housing 12 of the front edge 46 is identical for the embodiments in FIGS. 2 and 3, it stands that the rearview assembly 10 can be removed from the housing 12 and replaced with the rearview assembly 100. It is generally contemplated that one housing 12 can be used for either the rearview assembly 10 or the rearview assembly 100. Thus, the number of styles needed for engagement with different rearview assemblies can be lessened to one.

Referring now to the embodiment in FIG. 4, a rearview assembly 200, including a rearward viewing device 214, is illustrated. The rearward viewing device 214 includes front and rear glass elements 218 and 220, a reflective layer 224 (on either a front or rear surface of the rear glass element 220), an EC material 222 disposed between the front and rear glass elements 218, 220, and a foam backer or adhesive 230, and a carrier plate 221. The front and rear glass elements 218, 220 define a first surface 225, a second surface 226, a third surface 227, and a fourth surface 228.

The rearward viewing device 214 includes a ground edge 219 proximate a peripheral edge thereof. The rearward viewing device 214 is affixed to the carrier plate 221 via the foam backer or adhesive 230. The carrier plate 221 includes a rearwardly extending bottom flange 244, similar to that of the bezel 16, that overlappingly engages the front edge 46 of the housing 12. The carrier plate 221 includes a PCB abutment member 229 that serves as a locator for the PCB. The PCB abutment member 229 positively positions the PCB behind the carrier plate 221. The overlapping portions of the rearwardly extending bottom flange 244 include mating resilient hook and aperture connectors (similar to the connectors shown in FIG. 2) for providing snap attachment of the rearward viewing device 214 to the housing 12. In this embodiment, the rearward viewing device is used on an electrochromic-type mirror with the ground edge 219. The rearview assembly 200 includes a front glass element 218 having the ground edge 219 that transitions the rearward viewing device 214 to the housing 12. The periphery of the front glass element 218 is rounded to improve the visual appearance and durability of the front glass element 218, and the edge treatment can be performed by any number of suitable means.

The bezel 216 and housing 12 have complementary overlapping portions that provide attachment of the bezel 216 to the housing 12. To assemble the relevant components of the rearview assembly 200, the rearward viewing device 214 is coupled with the carrier plate 221, and this sub-assembly is installed into the housing 12. A connecting interface 250 couples the housing 12 and the rearward viewing device 214.

Once again, a single housing configuration can be used for attachment to either the rearview assembly 200, the rearview assembly 100, or the rearview assembly 10 during the manufacturing process. Stated differently, the rearview assemblies 10, 100, and 200 each include the connecting interface 50, 150, or 250, respectively, that allows the housing 12 to interface with any of the rearview assemblies 10, 100, or 200. This configuration enables an automotive manufacturer the ability to offer different rearview assembly options or kits with the same basic housing 12. The PCB abutment members 29, 129, 229 provide a uniform contact surface for placement of the relative PCB. Accordingly, uniformity across various product offerings can be maintained. For example, the automotive manufacturer can pair "premium," "standard," and "base" model vehicles with corresponding "premium," "standard," and "base" rearview assemblies, such as the various rearview assemblies described above. Further, in an automotive manufacturing facility that produces multiple vehicles, the facility can receive a single housing that includes hardware and software to support any of a variety of rearview assemblies such that any number of interchangeable rearward viewing devices can be installed in and used with a single housing. Rearview assembly kits, such as those shown and described herein, offer obvious advantages to the receiving and inventory departments and provides the Original Equipment Manufacturer (OEM) with substantial versatility and flexibility. In summary, during manufacturing, a single housing adapted for connection with multiple rearward viewing devices is installed into a vehicle. The OEM can then choose which rearward viewing device to connect with the housing 12.

It will be understood for each of the aforementioned embodiments illustrated in FIGS. 1-4 that other constructions could also be utilized. It will also be understood that features of every embodiment disclosed herein may be used in conjunction with other embodiments disclosed herein or incorporated by reference and not specifically discussed. The disclosed embodiments are to be construed as examples and are not to be construed as limiting.

The present invention may be used with a mounting system such as that described in U.S. Pat. Nos. 8,201,800; 8,210,695; U.S. patent application Ser. Nos. 13/600,496; 13/527,375; 13/431,657; 13/402,701; 12/187,019, and U.S. Provisional Patent Application Nos. 61/709,716; 61/707,676; and 61/704,869, which are hereby incorporated herein by reference in their entirety. Further, the present invention may be used with a rearview packaging assembly such as that described in U.S. Pat. No. 8,264,761; U.S. patent application Ser. Nos. 13/567,363; 13/405,697; 13/402,701; and 13/171,950, and U.S. Provisional Patent Application Nos. 61/707,625; and 61/590,259, which are hereby incorporated herein by reference in their entirety. Additionally, it is contemplated that the present invention can include a bezel such as that described in U.S. Pat. Nos. 8,201,800; 8,210,695; and U.S. patent application Ser. No. 13/271,745, which is hereby incorporated herein by reference in its entirety.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the preferred and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:
1. A rearview assembly kit for a vehicle comprising:
a housing;
a connecting interface disposed on a forward edge of the housing:
a first rearview device having a peripheral edge with a bezel, the bezel defining an outside stepped wall;
a second rearview device having a forward peripheral edge that is at least partially ground away, the second rearview device defining an outside stepped construction on a rearward peripheral edge thereof:

a third rearview device having an outer ring proximate a peripheral edge thereof, the third rearview device defining an outside stepped construction on a rear side thereof; and wherein the connecting interface of the housing includes an inside stepped construction configured to interchangeably engage with one of the first rearview device, the second rearview device, and the third rearview device.

2. The rearview assembly kit of claim 1, further comprising: removable
a stepped construction defined at a front edge of the housing and configured to matingly engage a complementary construction on one of a bezel and a carrier plate.

3. The rearview assembly kit of claim 2, wherein the stepped construction extends at least partially into the peripheral edge of the bezel.

4. The rearview assembly kit of claim 1, further comprising:
mating hooks on the housing configured to removably engage aperture connectors on one of a bezel and a carrier plate.

5. The rearview assembly kit of claim 1, further comprising:
a rounded engagement configuration defined at a front edge of the housing.

6. The rearview assembly kit of claim 1, wherein a front edge of the housing and the rearview device removably connected therewith includes an interference fit configuration.

7. The rearview assembly kit of claim 1, wherein a front edge of the housing and the rearview device removably connected therewith includes a friction fit configuration.

8. The rearview assembly kit of claim 1, wherein the housing includes supporting componentry for each of the rearview device having a peripheral edge with a bezel, the rearview device having a peripheral edge that is at least partially ground away, and the rearview device having an outer ring proximate a peripheral edge thereof.

9. A method of constructing a rearview assembly for a vehicle, comprising:
forming a housing;
forming a connecting interface on the housing;
providing a plurality of rearview devices, each of the rearview devices having one of the following constructions:
a peripheral edge with a bezel;
a peripheral edge that is at least partially ground away;
an outer ring proximate a peripheral edge thereof;
providing a complementary interface on each of the rearview devices;
selecting one of the rearview devices for engagement with the housing; and
removably connecting the housing with the rearview device by securing the connecting interface with the complementary interface.

10. The method of claim 9, further comprising:
providing supporting componentry for each of the rearview device having a peripheral edge with a bezel, the rearview device having a peripheral edge that is at least partially ground away, and the rearview device having an outer ring proximate a peripheral edge thereof.

11. The method of claim 9, further comprising:
providing mating hooks on the housing configured to removably engage aperture connectors on one of a bezel and a carrier plate.

12. The method of claim 9, further comprising:
forming a stepped engagement configuration defined at a front edge of the housing.

13. The method of claim 9, further comprising:
forming a rounded engagement configuration defined at a front edge of the housing.

* * * * *